United States Patent [19]
Kopystanski

[11] Patent Number: 5,934,243
[45] Date of Patent: Aug. 10, 1999

[54] DRIVE MECHANISM FOR A RECIPROCATING PISTON ENGINE

[76] Inventor: George Kopystanski, 16 Brule Gardens, Toronto, Ontario, Canada, M6S 4J2

[21] Appl. No.: 09/048,806

[22] Filed: Mar. 26, 1998

[51] Int. Cl.$^6$ .................................................... F02B 75/32
[52] U.S. Cl. ........................................................ 123/197.1
[58] Field of Search .............................. 123/197.1, 197.3, 123/197.4

[56] References Cited

U.S. PATENT DOCUMENTS

| | | |
|---|---|---|
| 1,316,437 | 9/1919 | Flood . |
| 1,399,900 | 12/1921 | Sprado . |
| 1,434,146 | 10/1922 | Powell . |
| 1,496,490 | 6/1924 | Powell . |
| 1,567,172 | 12/1925 | Powell . |
| 1,569,582 | 1/1926 | Scott . |
| 1,583,368 | 5/1926 | Powell . |
| 1,636,612 | 7/1927 | Noah . |
| 1,687,744 | 10/1928 | Webb . |
| 1,705,930 | 3/1929 | Leonard . |
| 1,708,888 | 4/1929 | Keeling . |
| 1,735,543 | 11/1929 | Palm . |
| 1,885,298 | 11/1932 | Schell . |
| 2,088,504 | 7/1937 | Brzezinski . |
| 2,155,497 | 4/1939 | Latil . |
| 2,334,684 | 11/1943 | Zappia . |
| 2,337,330 | 12/1943 | Julin . |
| 2,482,136 | 9/1949 | Wright . |
| 3,528,319 | 9/1970 | Ishida . |
| 3,604,204 | 9/1971 | Conrad et al. . |
| 3,895,620 | 7/1975 | Foster . |
| 3,916,866 | 11/1975 | Rossi . |
| 3,991,736 | 11/1976 | Spellman . |
| 4,135,409 | 1/1979 | Ishimaru . |
| 4,411,165 | 10/1983 | Evans . |
| 4,465,042 | 8/1984 | Bristol . |
| 4,803,964 | 2/1989 | Kurek et al. . |
| 4,890,589 | 1/1990 | Miyate . |
| 4,938,186 | 7/1990 | Pal et al. . |
| 4,951,615 | 8/1990 | Pahis . |
| 5,528,946 | 6/1996 | Yadegar ................................ 123/197.1 |
| 5,673,665 | 10/1997 | Kim ...................................... 123/197.3 |

*Primary Examiner*—John Kwon
*Attorney, Agent, or Firm*—Sperry, Zoda & Kane

[57] ABSTRACT

The present invention provides an improved drive mechanism for reciprocating engines primary adapted for converting reciprocating motion of a piston within a cylinder to rotary motion which includes a piston and piston leg assembly which moves solely axially within the piston chamber with two rack gear members secured to the sides of the piston leg. A power driveshaft and an idler driveshaft are positioned on opposite sides of the movable piston leg and include a plurality of gears thereon positioned adjacent to each piston chamber for receiving driving movement therefrom. This longitudinal movement of the piston is converted to rotational movement of the shaft through the rack gears and power and idler gears which are connected to the power driveshaft and the idler driveshaft through a unique configuration including clutch bearings adapted to convey power driving movement responsive to movement of the pistons toward the crankshaft and to be freewheeling during movement of the pistons away from the crankshaft. The power driveshaft and idler driveshaft are mounted parallel with respect to one another and are interconnected by drive gears. Power output is provided at the power driveshaft rather than at the crankshaft in a more conventional reciprocating piston engine configuration.

20 Claims, 5 Drawing Sheets

DRIVE MECHANISM FOR A RECIPROCATING PISTON ENGINE

BACKGROUND OF THE INVENTION

1. Field of the Invention

This invention relates generally to engines driven by pistons most usually and more particularly to internal combustion engines. These mechanisms are particularly useful for converting the reciprocating notion of a powered piston to a rotating output movement.

Most conventional engines included at multiple cylinders in which a piston reciprocates. The piston is then connected to an output crank by an elongated connecting rod pivoted at the upper end to the piston at the lower end to the crank. It is conventional that the output of the powers for such an engine and, in particular, for internal combustion engines, is the crankshaft rotary output. It is the unique configuration of the present invention to provide an energy efficient easily maintained functional replacement for that design.

2. Description of the Prior Art

Many patents have been granted to internal combustion designs utilizing gearing mechanisms for drives such as U.S. Pat. No. 1,316,437 patented Sep. 16, 1919 to H. L. Flood on a "Rack And Pinion Mechanism For Engines"; and U.S. Pat. No. 1,399,900 patented Dec. 13, 1921 to C. G. Sprado and assigned to Allis-Chalmers Manufacturing Company on a "Method Of And Apparatus For Manipulating Internal-Combustion Engines"; and U.S. Pat. No. 1,434,146 patented Oct. 31, 1922 to A. L. Powell and assigned to A. L. Powell Power Co. on an "Internal-Combustion Engine"; and U.S. Pat. No. 1,496,490 patented Jun. 3, 1924 to A. L. Powell and assigned to A. L. Powell Power Co. on a "Transmission For Engines"; and U.S. Pat. No. 1,567,172 patented Dec. 29, 1925 to A. L. Powell and assigned to A. L. Powell Power Co., Inc. on an "Internal-Combustion Engine"; and U.S. Pat. No. 1,569,582 patented Jan. 12, 1926 to C. W. Scott on an "Internal-Combustion Engine"; and U.S. Pat. No. 1,583,368 patented May 4, 1926 to A. L. Powell and assigned to A. L. Powell Power Company Incorporated on a "Transmission For Engines"; and U.S. Pat. No. 1,636,612 patented Jul. 19, 1927 to L. H. Noah on an "Internal-Combustion Engine"; and U.S. Pat. No. 1,687,744 patented Oct. 16, 1928 to F. M. Webb on a "Reciprocating Engine"; and U.S. Pat. No. 1,705,930 patented Mar. 19, 1929 to R. E. Leonard and assignment of one-half to David G. Lorraine on a "Long-Stroke Pump-Operating Mechanism"; and U.S. Pat. No. 1,708,888 patented Apr. 9, 1929 to I. N. Keeling and assignment of one-fourth to Andrew J. parks on a "Mechanical Movement"; and U.S. Pat. No. 1,735,543 patented Nov. 12, 1929 to V. H. Palm on an "Internal Combustion Engine"; and U.S. Pat. No. 1,885,298 patented Nov. 1, 1932 to A. A. Schell on an "Internal Combustion Engine"; and U.S. Pat. No. 2,088,504 patented Jul. 27, 1937 to E. Brzezinski on a "Crankless Motor"; and U.S. Pat. No. 2,155,497 patented Apr. 25, 1939 to A. Latil on a "Transforming Alternating Rectilinear Movement Into Continuous Rotary Movement"; and U.S. Pat. No. 2,334,684 patented Nov. 16, 1943 to A. T. Zappia and assigned to Fairmount Glass Works, Inc. on an "Intermittent Drive Mechanism"; and U.S. Pat. No. 2,337,330 patented Dec. 21, 1943 to Z. J. Julin on a "Driving Mechanism"; and U.S. Pat. No. 2,482,136 patented Sep. 20, 1949 to W. N. Wright on an "Engine"; and U.S. Pat. No. 3,528,319 patented Sep. 15, 1970 to Kenjiro Ishida and assigned to President Shizuoka University on a "Perfectly Balanced Vibrationless Rotation-Reciprocation Device Of Crankshaft Planetary Motion System"; and U.S. Pat. No. 3,604,204 patented Sep. 14, 1971 to H. Conrad et al and assigned to Fried Krupp Gesellschaft mit beschrankter Haftung on a "Counterpiston Machine, Especially Counterpiston Motor"; and U.S. Pat. No. 3,895,620 patented Jul. 22, 1975 to B. Foster on an "Engine And Gas Generator"; and U.S. Pat. No. 3,916,866 patented Nov. 4, 1975 to J. M. Rossi on an "Engine Having Reciprocating Piston And Rotary Piston"; and U.S. Pat. No. 3,991,736 patented Nov. 16, 1976 to R. C. Spellman and assigned to Raymond Lee Organization, Inc. on a "Ratchet Driving Internal Combustion Engine"; and U.S. Pat. No. 4,135,409 patented Jan. 23, 1979 to R. Ishimaru on a "Device For Converting Rocking Motion Into Reciprocating Rotary Motion"; and U.S. Pat. No. 4,411,165 patented Oct. 25, 1983 to L. Evans on a "Power Transmission Unit With Infinite Speeds"; and U.S. Pat. No. 4,465,042 patented Aug. 14, 1984 to R. Bristol on a "Crankless Internal Combustion Engine"; and U.S. Pat. No. 4,803,964 patented Feb. 14, 1989 to W. Kurek et al on an "Internal Combustion Engine"; and U.S. Pat. No. 4,890,589 patented Jan. 2, 1990 to H. Miyate and assigned to Nissan Shatai Company, Limited on a "Variable Capacity Type Reciprocating Piston Device"; and U.S. Pat. No. 4,938,186 patented Jul. 3, 1990 to L. Pal et al on an "Internal Combustion Engine Variable Stroke Mechanism"; and U.S. Pat. No. 4,951,615 patented Aug. 28, 1990 to N. Pahis on a "Motion-Conversion Mechanism For A Four Stroke Oscillating Piston Internal Combustion Engine".

SUMMARY OF THE INVENTION

The present invention provides an improved drive mechanism used for a reciprocating piston engine which includes a housing block defining multiple cylinders therein and preferably four such cylinders. A crankshaft is rotatably mounted within the housing block and includes a plurality of piston journals defined thereon. Preferably the crankshaft where mounted within the housing block includes crankshaft support journals therein to facilitate rotational movement of the crankshaft with respect to the housing block.

A piston member is included positioned within each of the cylinders defined by the housing block such as to be movably axially therewithin. Each of the pistons preferably includes a piston head drive surface and a piston leg extending therefrom preferably downwardly. The piston leg is preferably fixedly secured with respect to the piston and is oriented perpendicularly with respect to the piston head drive surface. In this manner each of the pistons and the piston legs will be adapted to move axially within the cylinder without any component of movement thereof whatsoever laterally with respect to the axis of the particular cylinder. As such, conventional wobble of a piston head resulting from off-axis movement of a conventional connecting rod is avoided.

A piston link arm apparatus is included pivotally attached with respect to each of the piston legs and pivotally attached with respect to the piston journal. The piston link arm preferably includes a first link arm end pivotally secured to the piston leg. Also the piston link arm preferably includes a second link arm end pivotally secured with respect to one of the piston journals. This second link arm also is positioned to be spatially disposed on the piston link arm remotely from the location of the first link arm in such a manner as to mechanically create pivotal linkage interconnecting the piston with respect to the crankshaft. A piston pin may also be included extending through the first link arm end and the piston leg in order to maintain the pivotal engagement therebetween.

A power driveshaft is also included rotatably mounted within the housing block adjacent the path of movement of each of the piston legs. An idler driveshaft may also be included rotatably mounted within the housing block at a location opposite from the position of the power driveshaft. This idler driveshaft is preferably positioned extending generally parallel with respect to the power driveshaft and opposite therefrom with the path of movement of the piston leg positioned therebetween.

A plurality of power clutch bearings are fixedly secured on each of the power driveshafts adjacent each of the piston legs. Each of these power clutch bearings include a power inner race fixedly secured to the power driveshaft and a power outer race. The power clutch bearings are adapted to provide the power inner race in fixed securement with respect to the power outer race only responsive to rotation thereof in a first power direction which is preferably clockwise. They are adapted to provide freewheeling relative rotatable attachment therebetween responsive to rotation thereof in a second power direction normally being counterclockwise.

A plurality of power drive gears are each mounted securely to the power outer race of the one of the power clutch bearings. A plurality of power rack gears are preferably fixedly secured to the piston legs and are movable therewith adjacent the power driveshaft means. They are also preferably in engagement with the power driving gear mounted on the power driveshaft thereadjacent. The power rack gear also is preferably reciprocally movable with the piston leg and is maintained in continuous engagement with the power driving gear located thereadjacent. A power timing gear is preferably fixedly secured to the power driveshaft adjacent the output end thereof.

A plurality of idler clutch bearings are fixedly secured onto the idler driveshaft adjacent each of the piston legs. Each of these idler clutch bearings include an idler inner race fixedly secured to the idler driveshaft and an idler outer race. The idler clutch bearing is adapted to provide the idler inner race in fixed securement with respect to the idler outer race responsive to rotation thereof in a first idler direction being preferably counterclockwise. It is also adapted to provide freewheeling rotatable attachment therebetween responsive to rotation thereof in a second idler direction which preferably is clockwise.

A plurality of idler drive gears are included each mounted directly to the idler outer race of one of the idler clutch bearings. Also multiple idler rack gears are included each being fixedly secured to the piston leg and movable therewith adjacent the idler driveshaft. Each idler rack gear is in engagement with the idler driving gear mounted on the idler driveshaft thereadjacent. The idler rack gear is preferably reciprocally movable with the piston leg and maintained in continuous engagement with the idler driving gear located thereadjacent. Each of these idler rack gears are preferably oppositely positioned on the piston leg from the power rack gear located thereon.

An idler timing gear is preferably fixedly secured to the idler driveshaft adjacent to the power timing gear and in operative engagement therewith in order to facilitate driving of the power driveshaft by the idler driveshaft at certain points in the cycle of reciprocating motion of this engine. A power output shaft may preferably be fixedly secured with respect to the power driveshaft in such a manner as to be axially coincident therewith in order to provide access to power for delivery as desired.

It is an object of the present invention to provide an improved drive mechanism for a reciprocating piston engine assembly wherein maintenance requirements are minimized.

It is an object of the present invention to provide an improved drive mechanism for a reciprocating piston engine assembly wherein initial capital cost outlay for producing the assembly is minimized.

It is an object of the present invention to provide an improved drive mechanism for a reciprocating piston engine assembly wherein down time is minimized.

It is an object of the present invention to provide an improved drive mechanism for a reciprocating piston engine assembly wherein output power is provided at an output shaft other than the crankshaft.

It is an object of the present invention to provide an improved drive mechanism for a reciprocating piston engine assembly wherein rocking of pistons moving through the cylindrical cylinders is minimized.

It is an object of the present invention to provide an improved drive mechanism for a reciprocating piston engine assembly wherein oil consumption is minimized.

It is an object of the present invention to provide an improved drive mechanism for a reciprocating piston engine assembly wherein cylinder wear is minimized.

It is an object of the present invention to provide an improved drive mechanism for a reciprocating piston engine assembly wherein less heat is generated in the engine generally and within the cylinders specifically.

It is an object of the present invention to provide an improved drive mechanism for a reciprocating piston engine assembly wherein usage with diesel and/or gasoline powered or other powered engine configurations is possible.

It is an object of the present invention to provide an improved drive mechanism for a reciprocating piston engine assembly wherein the cost of production of the crankshaft can be greatly minimized since it requires less weight because it does not provide the source of drive output from the motor.

It is an object of the present invention to provide an improved drive mechanism for a reciprocating piston engine assembly wherein usage with a conventional internal combustion engine is possible.

It is an object of the present invention to provide an improved drive mechanism for a reciprocating piston engine assembly wherein usage with any fluid powered piston engine is possible including both pneumatic and hydraulic power piston systems.

It is an object of the present invention to provide an improved drive mechanism for a reciprocating piston engine assembly wherein the unique combination and positioning of clutch bearings provide continuous power to the output shaft, which provides frictional power to the crankshaft.

It is an object of the present invention to provide an improved drive mechanism for a reciprocating piston engine assembly wherein usage with any number of multiple cylinders is possible.

It is an object of the present invention to provide an improved drive mechanism for a reciprocating piston engine assembly wherein usage with any conventional valve configurations is made possible.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The improved drive mechanism for a reciprocating piston engine of the present invention includes a housing block 10 defining a plurality of individual cylinders 12 thereon. Preferably cylinders 12 are of a cylindrical cross section. A crankshaft 14 is rotatably mounted within the housing block 10 to facilitate rotation of crankshaft 14. It can include a plurality of crankshaft journals 18 thereon which are designed to be mounted within bearings in the housing block 10 in the conventional manner. The crankshaft 14 preferably also defines a plurality of piston journals 16 adjacent to each of the cylinders 12 to facilitate interconnection of the crankshaft with respect to the pistons located therewithin.

A piston means 20 is preferably movably positioned within each of the cylinders 12. Each piston 20 includes a piston leg 24 fixedly secured thereto and extending downwardly therefrom. Each piston 20 also includes a piston head drive surface 22 facing the interior portion of the cylinder 12 to receive power transmitted therefrom. In the preferred orientation of the pistons 20 of the present invention the individual piston leg 24 will be oriented perpendicularly with respect to the piston head drive surface 22.

Figure 1:
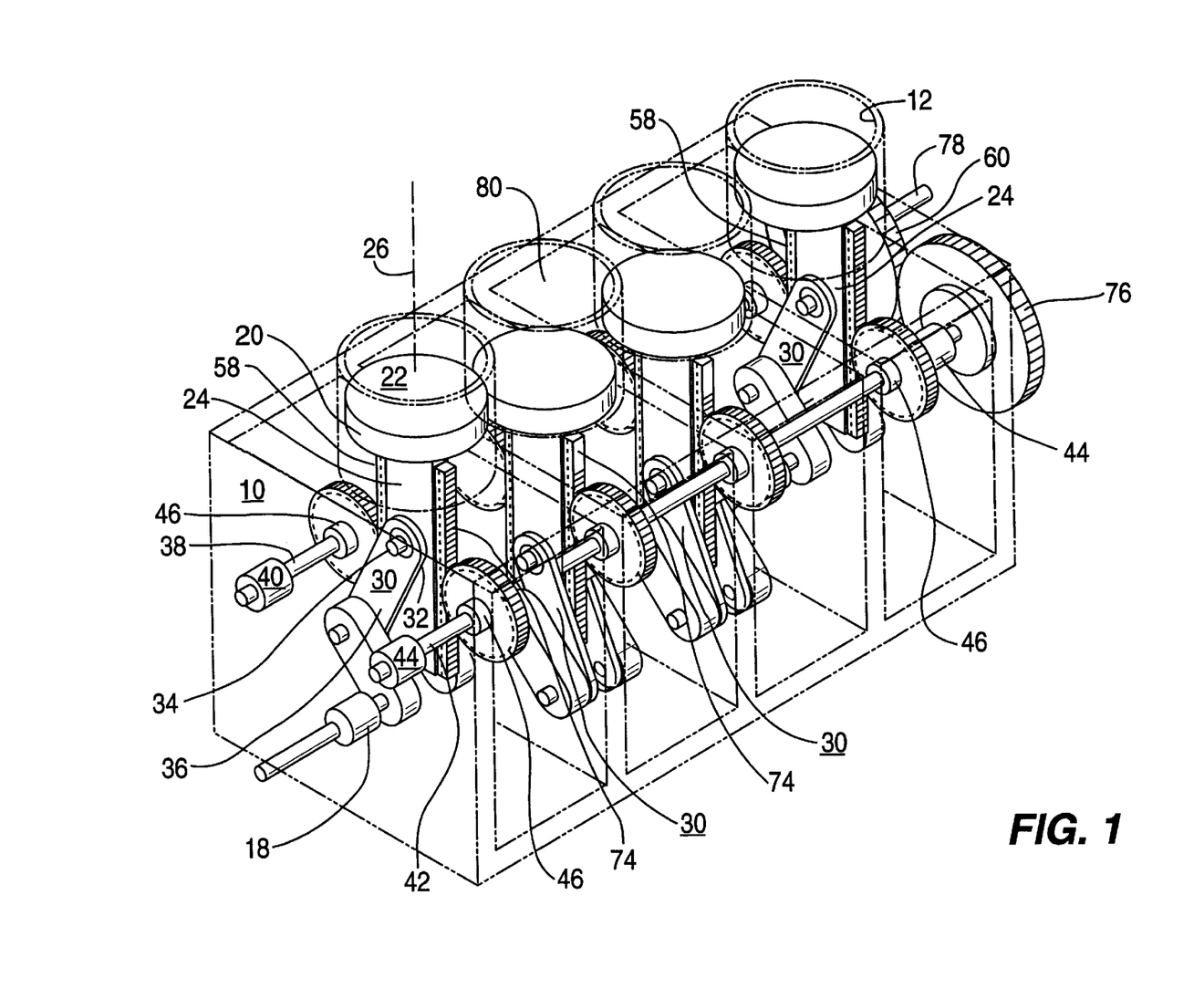
FIG. 1 is a perspective illustration of an embodiment of the improved drive mechanism for a reciprocating piston engine of the present invention.
Figure 2:
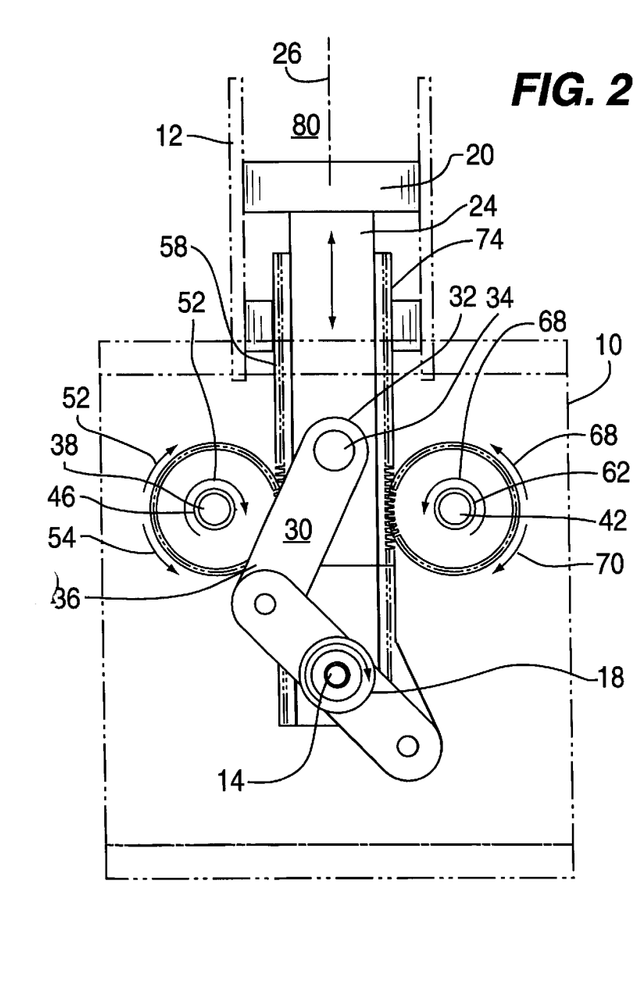
FIG. 2 is an end plan view of the embodiment shown in FIG. 1 as viewed from the left.
Figure 3:
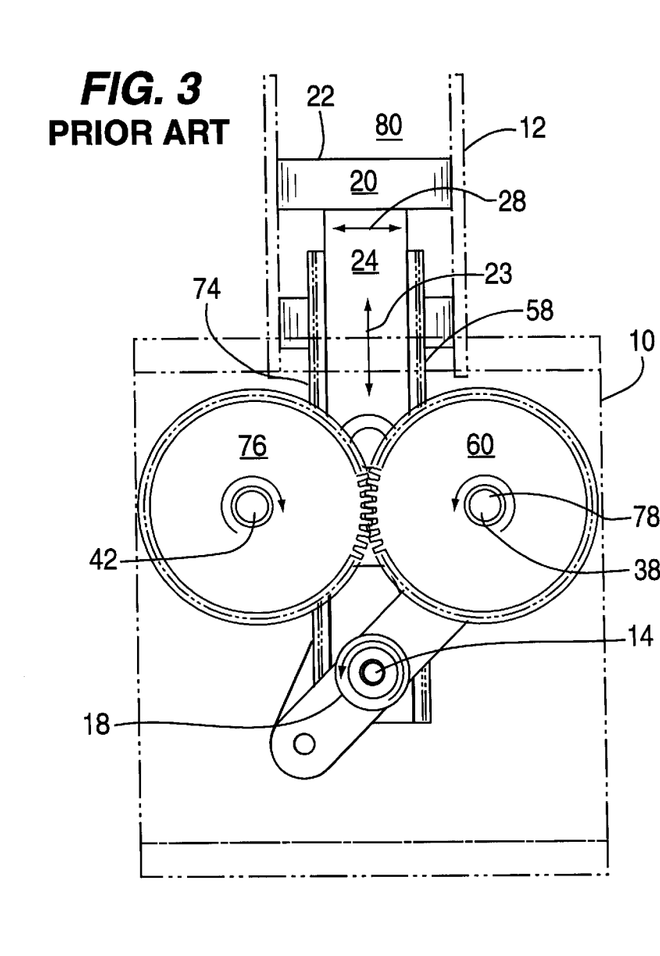
FIG. 3 is a rear plan view of the embodiment shown in FIG. 1 as viewed from the right.
Figure 4:
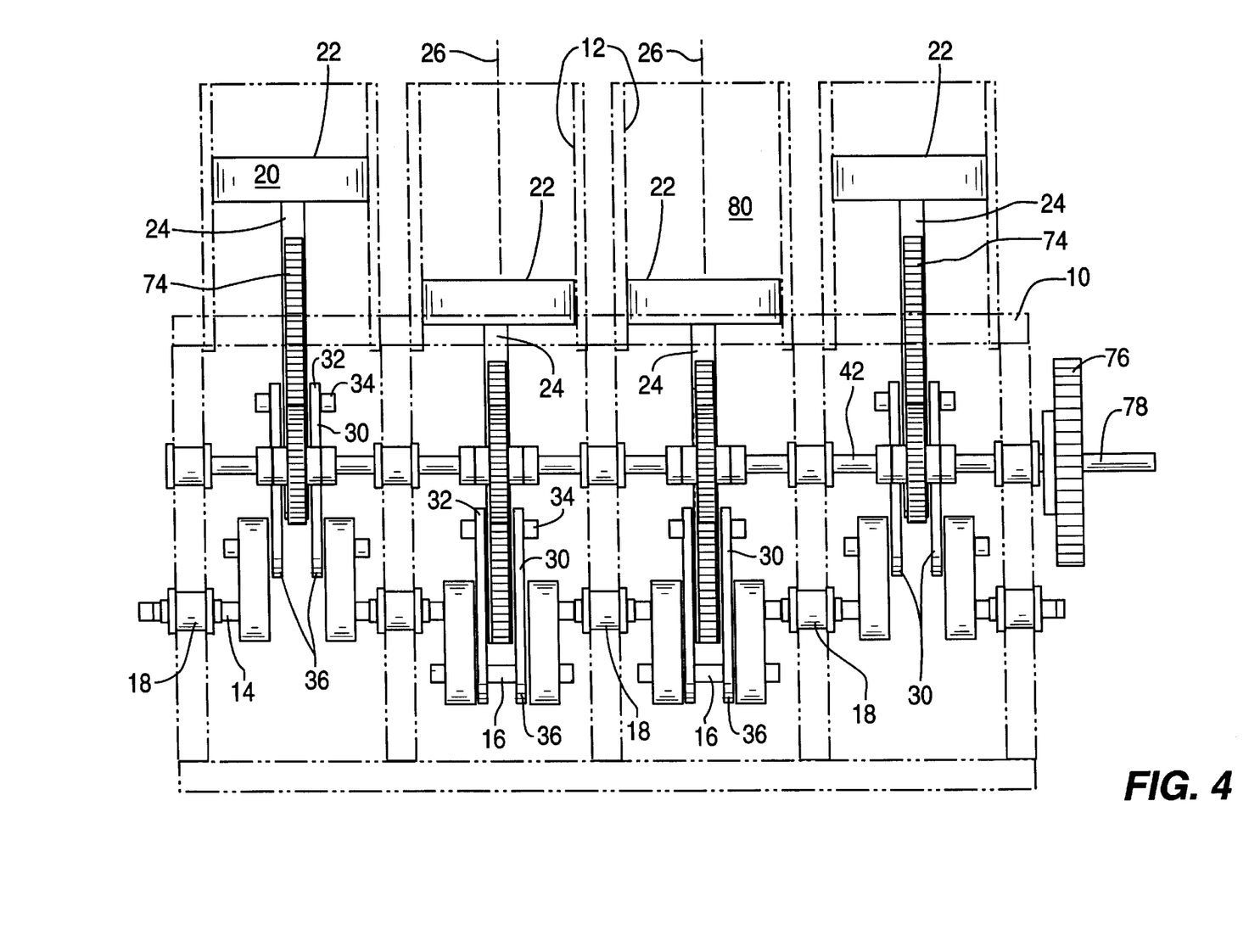
FIG. 4 is a side plan view of the embodiment shown in FIG. 1 with the outer pistons in the uppermost position and the inner pistons in the lowermost position.
Figure 5:
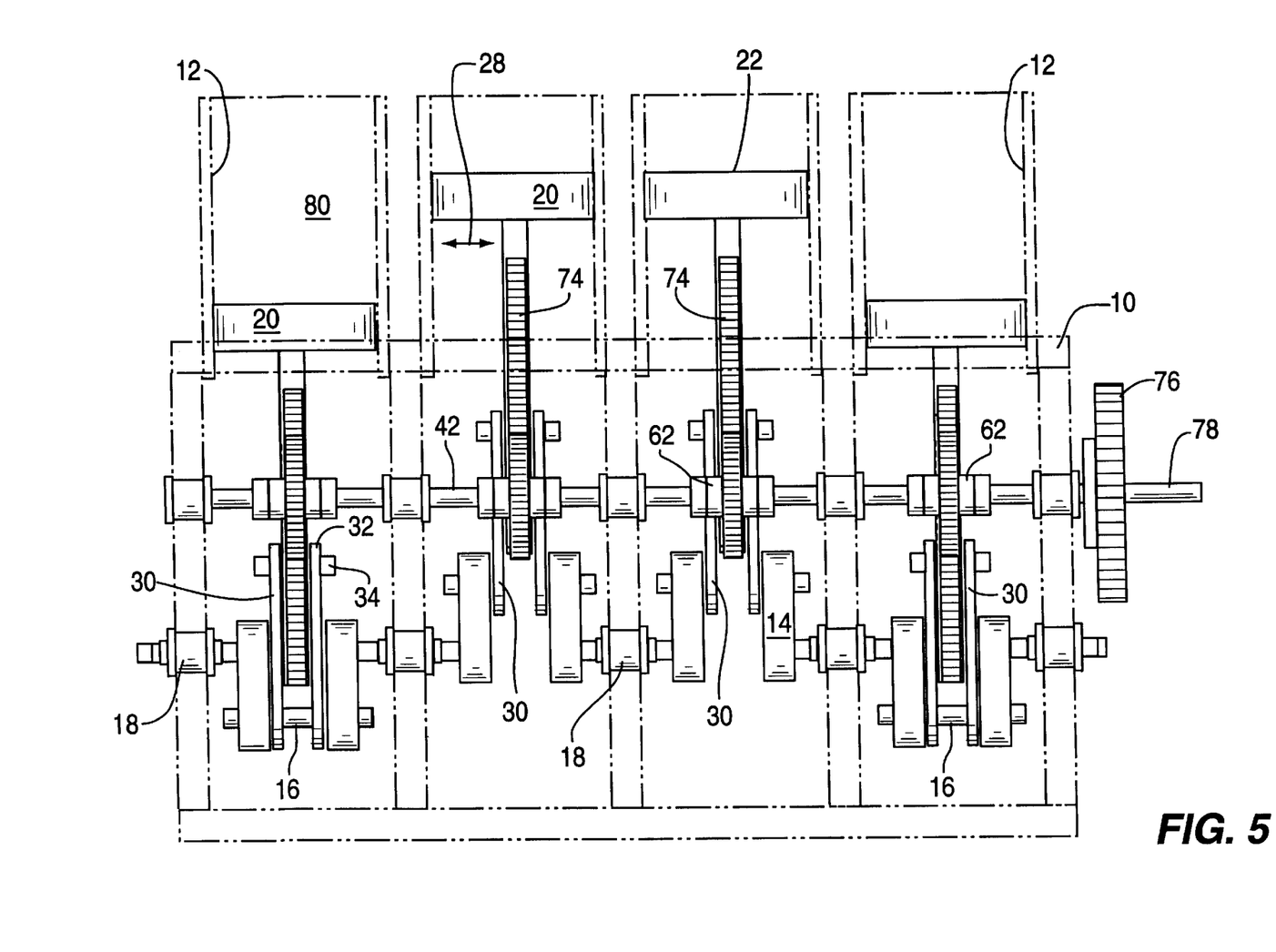
FIG. 5 is the same view shown in FIG. 4 with the inner pistons in the uppermost position and the outermost pistons in the lowermost position.

The pistons 20 are designed to move as shown in FIG. 2 vertically along a cylindrical axis 26 within the cylinder 12. One of the important aspects of the present invention is that the piston 20 only has a vertical component of movement and has no lateral movement component 28 as shown in FIG. 3. The vertical movement component shown by arrow 23 is designed to smoothly slide along the interior wall surfaces of cylinder 12. Since there is no lateral movement component 28 in the apparatus of the present invention a distinct improvement over prior art internal combustion engines is achieved. The elimination of such lateral movement or wobble significantly reduces wear on the interior walls of the cylinder which enhances performance, efficiency and significantly reduces oil consumption thereof.

In order to maintain this vertical orientation during movement of the piston, a piston link arm 30 is preferably positioned interconnecting the piston leg 24 with the piston journal 16. This piston link arm 30 preferably includes a first link arm end 32 and a second link arm end 36 spatially disposed with respect to one another preferably at opposite ends at the piston link arm 30. The first link arm means 32 is preferably secured to the piston leg 24 by a piston pin 34. The use of this piston pin 34 enhances the pivotal yet secure interconnection between the first link arm end 32 of piston link arm 30 and the piston leg 24. The opposite end of the piston link arm 30 which is defined as the second link arm end 36 is preferably pivotally secured with respect to piston journal 16 on the crankshaft 14.

A very important aspect of the present invention is the inclusion of a power driveshaft 38 rotatably mounted within the housing block 10 preferably at a position above the crankshaft and running along one side of the cylinders 12. Power driveshaft 38 is preferably mounted in a plurality of power driveshaft journals 40 defined within housing block 10. On the opposite side of the cylinders 12 from the power driveshaft 38 is preferably located an idler driveshaft 42. Preferably idler driveshaft 42 is rotatably mounted within a plurality of idler driveshaft journals 44 defined within the housing block 10.

The power driveshaft 38 and the idler driveshaft 42 are preferably spaced apart from one another and extend parallel with respect to one another and provides a means for withdrawing power from the apparatus of the present invention and for maintaining the piston 20 in vertical orientation during movement thereof.

A plurality of power clutch bearings 46 are mounted on the power driveshaft 38 at each location thereof immediately adjacent to one of the cylinders 12. Power clutch bearing 46 includes a power inner race 48 as well as a power outer race 50 movably oriented with respect to one another. A power drive gear 56 is positioned fixedly secured to the power outer race 50 at each location of positioning of the power clutch bearing 46 adjacent each of the pistons 20.

A power rack gear 58 is positioned fixedly secured with respect to the piston leg 24 and extending vertically at a position immediately adjacent to the power drive gear 56. Power timing gear 60 and idler timing gear 76 are positioned with the gear teeth thereof in engagement with respect to one another at all times. The configuration of the power clutch bearing 46 is such that rotation of the outer race 50 in a clockwise direction as shown in FIG. 2 causes similar clockwise rotation of the power inner race 48. However, as also shown in FIG. 2, rotation of the power outer race 50 counterclockwise with respect to the power inner race 48 will be freewheeling as controlled by the power clutch bearing 46. Clutch bearing 46, thus, is designed such that whenever power outer race 50 is rotated clockwise during movement of the piston 20 toward the crankshaft 14 a similar rotational movement will occur of the power inner race 48 and consequently the power driveshaft 38 resulting from powered engagement of the teeth of the power rack gear 58 in engagement with the power drive gear 56. This configuration is included for each of the cylinders 12.

In a similar manner the power clutch bearing 46 is designed to disengage the power inner race 48 from the power outer race 50 and allows freewheeling thereof whenever, as shown in FIG. 2, the power outer race 50 is rotated in the counterclockwise direction 54. During that portion of the stroke one of the other cylinders will be in the drive mode causing rotation of its associated gearing mechanism for maintaining continuous drive powering of the engine of the present apparatus. With respect to the configuration shown in FIG. 2, whenever the piston 20 is moved toward the crankshaft 14 the power clutch bearing 46 will be in the drive mode firmly interconnecting the power inner race 48 with respect to the power outer race 50 causing driving movement. This results from movement in the first power direction 52 which is clockwise as shown in FIG. 2.

The second power direction 54 is as described above, however, there is no connection within the clutch bearing during movement in that counterclockwise direction. This results in a freewheeling relationship between the power inner race 48 and the power outer race 50.

The power driveshaft 38 so driven by the above described configuration will provide power output through a power output shaft 78 which is preferably axially coincident thereto and extending outwardly from the housing block 10.

To provide continuous power to the output shaft 78 the present invention includes a supplementary power driving shaft. This is defined as the idler driveshaft 42. Outer driveshaft 42 is of a similar configuration to the power driveshaft 38 but is oppositely positioned with respect to the piston legs 24. The idler driveshaft 42 is driven and includes an idler timing gear 76 in engagement with a power timing gear 60 fixedly secured to the power driveshaft 38 adjacent the power output shaft 78 thereof. Powering of the idler driveshaft 42 thus will achieve powering of the power output shaft 78 due the engagement between the idler timing gear 76 and the power timing gear 60.

The idler driveshaft 42 is crafted to a similar configuration as is the power driveshaft 38. Idler driveshaft 42 includes a plurality of idler clutch bearings 62 positioned thereon at each location immediately adjacent to a cylinder 12. Each idler clutch bearing 62 includes an idler inner race 64 and an idler outer race 66 which have controlled movement with respect to one another as controlled by the idler clutch bearing 62. Whenever the idler outer race 66 is moved as shown in FIG. 2 in the first idler direction 68, which in this configuration is the counterclockwise direction, then the idler inner race 64 and the idler outer race 66 are firmly secured with respect to one another causing driving of the idler inner race. Since the idler inner race is fixedly secured with respect to the idler driveshaft 42, power driving thereof is caused by rotation of the idler outer race 66 in the counterclockwise direction. The idler outer race 66 is adapted to receive an idler drive gear 72 mounted thereon. This idler drive gear 72 is adapted to engage the teeth of an idler rack gear 74 which is fixedly secured with respect to a piston leg 24. Normally such a piston leg 24 will include an idler rack gear 74 on one side thereof and a similarly configured power rack gear 58 on the opposite side thereof.

The idler rack gear 74 being in engagement with respect to the idler drive gear 72 will cause rotation thereof. Whenever the piston 20 is moved toward the crankshaft 14 the idler rack gear 74 will cause rotation of the idler drive gear 72 as shown in FIG. 2 in the counterclockwise direction which is the drive direction for the idler clutch bearing 62. Thus, the idler inner race 64 will be rotating in a counterclockwise direction and cause drive rotation of the idler driveshaft 42.

Whenever the piston 20 is moving in a direction away from the crankshaft 14 the idler rack gear 74 will cause clockwise rotation of the drive gear 72 and the idler outer race 66 secured thereto. This clockwise rotation is defined as the second idler direction 70 as shown in FIG. 2 which is freewheeling. The idler clutch bearing 62 defines such clockwise movement to be freewheeling and, as such, is the directional movement for non-power or non-driving driving of the idler driveshaft 42.

By positioning of the idler rack gear 74 and the power rack gear 58 on opposite vertically extending sides of the piston leg 24, it will be wedged between the idler drive gear 72 and the power drive gear 56 within each cylinder configuration 12. As such, the piston 20 and the piston leg 24 will be always maintained in a vertical orientation to allow vertical movement 23 and to prevent any lateral movement component 28.

The use of both the power driveshaft 38 and the idler driveshaft 42 provides an overall balance configuration which enhances the stability and strength and efficiency of operation of the drive mechanism for the reciprocating piston engine of the present invention.

Thus we see that each of the pistons will alternately drive the idler drive gear 72 and the power drive gear 56 associated therewith depending on whether the piston is in power stroke moving downwardly. When moving downwardly in power stroke, the power is applied to the two power shaft, namely, the power driveshaft 38 and the idler driveshaft 42. Movement upward in the non-powered movement direction of the piston will result in freewheeling as controlled by the idler clutch bearing 62 and power clutch bearing 46.

Fixed interconnection of the power driveshaft 38 with respect to the idler driveshaft 42 is achieved through the full and continuous engagement of the idler timing gear 76 with respect to the power timing gear 60. Coordinated movement of these parts provides power output to the power output shaft 78 axially coincident with the power driveshaft 38. Normally this power output shaft would be connected with respect to a flywheel or torque converter or other device that can be powered by a rotating driveshaft. This power output shaft 78 provides the power takeoff for the improved drive mechanism of the engine of the present invention.

One of the important aspects of the present invention is that the crankshaft is not used as the means for transmitting power output. As a result the crankshaft of the present invention can be with much smaller parts since strength is not required. Thus, the cost of manufacturing and the weight of the crankshaft can be significantly reduced. The power is applied through the combination of the power driveshaft 38 and the idler driveshaft 42 which pinches the piston legs 24 between the drive gears mounted thereon for maintaining vertical orientation of the pistons within the cylinders and for receiving balanced coordinated power. The use of two powering shafts eliminates the necessity for a single extremely heavy duty power output shaft such as the crankshaft of a conventional internal combustion engine. Such parts tend to provide the weak link in regard to maintenance and construction of such engine assemblies.

By avoiding the wobble or rocking of the individual pistons wear of the interior portion of the cylinders 12 is minimized. Less heat is also generated at this location and less oil is used.

It should be appreciated that the apparatus of the present invention can be utilized with any type of piston powering system such as conventional internal combustion utilizing diesel or gasoline for power or any other fluid system such as hydraulic or pneumatic powering systems.

The configuration of the driveshafts of the present invention is made possible by the clutch bearings which provide full drive in one direction and full freewheeling in the opposite direction. Such clutch bearings are readily available. Often movement in the freewheeling direction is also defined in such clutch bearings to be the overrun mode and movement in the drive direction is defined to be movement in the lock mode.

Figure 6:
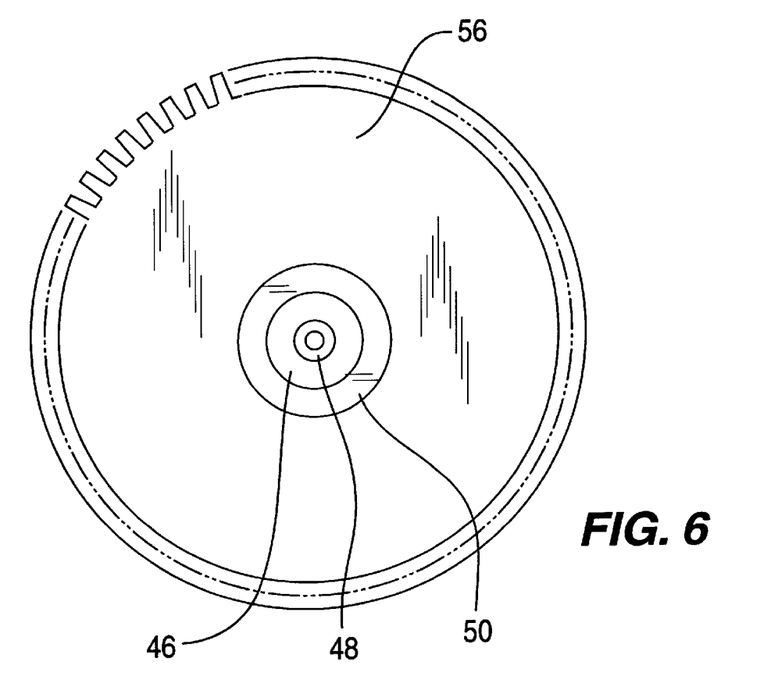
FIG. 6 is a front plan view of an embodiment of a power clutch bearing made in accordance with the present invention.
Figure 7:
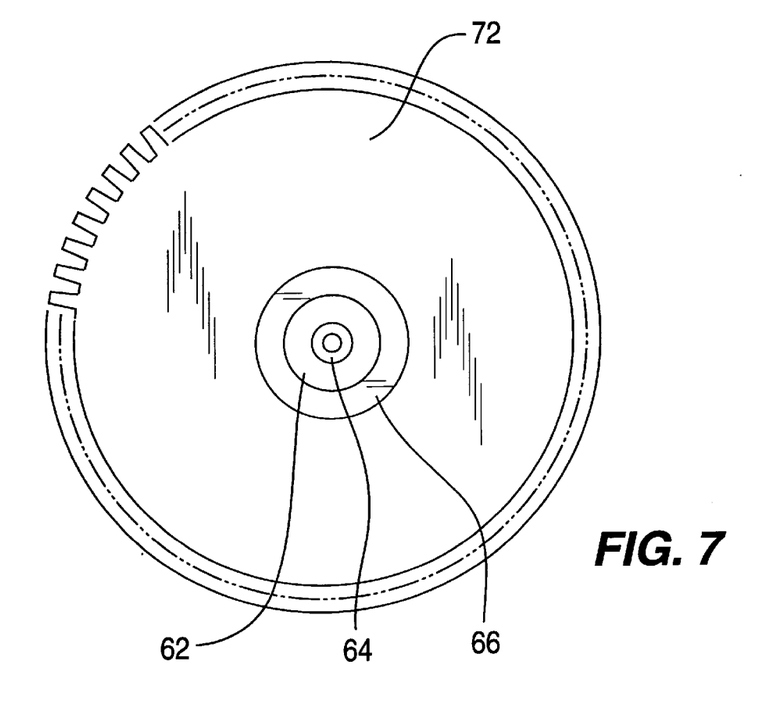
FIG. 7 is front plan view of the an embodiment of an idler clutch bearing made in accordance with the present invention.

It should be appreciated that a single clutch bearing component can comprise both the power clutch bearings 46 and the idler clutch bearings 62 of the present invention. Although we have included two separate figures to show these two bearings, actually the two bearing configurations can be provided by a single clutch bearing part merely by reversing the direction of the bearing axis to provide a clutch bearing which drives in the opposite direction on one side and in the freewheeling direction also oppositely. Thus, a single part can be used for the clutch bearing of the present invention wherein drive is achieved in one direction and freewheeling is created in the opposite direction.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved drive mechanism for a reciprocating piston engine comprising:

A. a housing block means defining a plurality of cylinder means therein;

B. a crankshaft means rotatably mounted within said housing block means, said crankshaft means including a plurality of piston journal means;

C. a plurality of piston means movably positioned within said cylinder means, each of said piston means including a piston head drive surface and a piston leg means extending therefrom, said piston leg means being fixedly secured to said piston means;

D. a piston link arm means pivotally attached with respect to each of said piston leg means and being pivotally attached with respect to each of said piston journal means;

E. a power driveshaft means rotatably mounted within said housing block means adjacent the path of movement of each of said piston leg means;

F. an idler driveshaft means rotatably mounted within said housing block means spatially disposed from said power driveshaft means and adjacent the path of movement of said piston leg means opposite from said power driveshaft means;

G. a plurality of power clutch bearing means fixedly secured onto said power driveshaft means adjacent each of said piston leg means, each of said power clutch bearing means including a power inner race means fixedly secured to said power driveshaft means and a power outer race means, said power clutch bearing means being adapted to provide said power inner race means in fixed securement with respect to said power outer race means responsive to rotation thereof in a first power direction and being adapted to provide freewheeling rotatable attachment therebetween responsive to rotation thereof in a second power direction;

H. a plurality of power drive gear means each mounted securely to said power outer race means of one of said power clutch bearing means;

I. a plurality of power rack gear means each being fixedly secured to said piston leg means and movable therewith adjacent said power driveshaft means and being in engagement with said power driving gear means mounted on said power driveshaft means thereadjacent;

J. a power timing gear means fixedly secured to said power driveshaft means;

K. a plurality of idler clutch bearing means fixedly secured onto said idler driveshaft means adjacent each of said piston leg means, each of said idler clutch bearing means including a idler inner race means fixedly secured to said idler driveshaft means and a idler outer race means, said idler clutch bearing means being adapted to provide said idler inner race means in fixed securement with respect to said idler outer race means responsive to rotation thereof in a first idler direction and being adapted to provide freewheeling rotatable attachment therebetween responsive to rotation thereof in a second idler direction;

L. a plurality of idler drive gear means each mounted securely to said idler outer race means of one of said idler clutch bearing means;

M. a plurality of idler rack gear means each being fixedly secured to said piston leg means and movable therewith adjacent said idler driveshaft means and being in engagement with said idler driving gear means mounted on said idler driveshaft means thereadjacent; and N. a idler timing gear means fixedly secured to said idler driveshaft means adjacent said power timing gear means and in operative engagement therewith to facilitate driving of said power driveshaft means.

2. An improved drive mechanism for a reciprocating piston engine as defined in claim 1 wherein each of said piston leg means is oriented perpendicularly with respect to said piston head drive surface for each of said piston means.

3. An improved drive mechanism for a reciprocating piston engine as defined in claim 1 wherein said idler driveshaft means and said power driveshaft means are positioned spatially disposed from one another with said piston leg means positioned therebetween.

4. An improved drive mechanism for a reciprocating piston engine as defined in claim 1 wherein said first power direction is rotationally opposite from said first idler direction and rotationally identical to said second idler direction.

5. An improved drive mechanism for a reciprocating piston engine as defined in claim 1 wherein said second power direction is rotationally opposite from said second idler direction and rotationally identical to said first idler direction.

6. An improved drive mechanism for a reciprocating piston engine as defined in claim 1 wherein said first power direction and said second idler direction are both clockwise.

7. An improved drive mechanism for a reciprocating piston engine as defined in claim 1 wherein said second power direction and said first idler direction are both counter-clockwise.

8. An improved drive mechanism for a reciprocating piston engine as defined in claim 1 wherein driving of said power driveshaft means is urged by movement of said piston means and said piston leg means thereof in a direction toward said crankshaft means.

9. An improved drive mechanism for a reciprocating piston engine as defined in claim 1 wherein freewheeling movement of said power clutch bearing means is achieved during movement of said piston means and said piston leg means thereof in a direction away from said crankshaft means.

10. An improved drive mechanism for a reciprocating piston engine as defined in claim 1 wherein said piston link arm means further comprises:

A. a plurality of first link arm end means each being pivotally secured to one of said piston leg means; and B. a plurality of second link arm end means each being pivotally secured with respect to one of said piston journal means, said second link arm end means being spatially disposed on said piston link arm means remotely from said first link arm end means to achieve linked interconnection of each of said piston means with respect to said crankshaft means.

11. An improved drive mechanism for a reciprocating piston engine as defined in claim 1 wherein each of said idler rack gear means is oppositely positioned on said piston leg means from said power rack gear means positioned thereon.

12. An improved drive mechanism for a reciprocating piston engine as defined in claim 1 further comprising a plurality of piston pin means passing through each of said piston leg means and said piston link arm means thereadjacent to provide pivotally movable engagement therebetween.

13. An improved drive mechanism for a reciprocating piston engine as defined in claim 1 wherein said housing block means defines four cylinders therewithin and wherein said piston means includes four individual pistons positioned therein.

14. An improved drive mechanism for a reciprocating piston engine as defined in claim 1 wherein said power clutch bearing means and said idler clutch bearing means are structurally identical with the rotational axes thereof oriented oppositely with respect to one another to provide opposite directions of freewheeling movement as positioned mounted on said power driveshaft means and said idler driveshaft means.

15. An improved drive mechanism for a reciprocating piston engine as defined in claim 1 further comprising a power output shaft means fixedly secured to said power driveshaft means and axially coincident therewith to provide power for delivery as desired.

16. An improved drive mechanism for a reciprocating piston engine as defined in claim 1 wherein said power driveshaft means and said idler driveshaft means are oriented axially parallel with respect to one another.

17. An improved drive mechanism for a reciprocating piston engine as defined in claim 1 wherein said power drive gear means is maintained in engagement with said power rack gear means and wherein said idler power gear means is maintained in engagement with said idler rack gear means continuously during movement of said piston leg means therebetween.

18. An improved drive mechanism for a reciprocating piston engine as defined in claim 17 wherein each of said piston means and said piston leg means are adapted to move axially within said cylinder means without any movement component thereof oriented laterally with respect to the axes of said cylinder means.

19. An improved drive mechanism for a reciprocating piston engine comprising:
  A. a housing block means defining a plurality of cylinder means therein;
  B. a crankshaft means rotatably mounted within said housing block means, said crankshaft means including a plurality of piston journal means;
  C. a plurality of piston means movably positioned within said cylinder means, each of said piston means including a piston head drive surface and a piston leg means extending therefrom, said piston leg means being fixedly secured to said piston means and oriented perpendicularly with respect to said piston head drive surface, each of said piston means and said piston leg means adapted to move axially within said cylinder means without any movement component thereof oriented laterally with respect to the axes of said cylinder means;
  D. a piston link arm means pivotally attached with respect to each of said piston leg means and being pivotally attached with respect to each of said piston journal means, said piston link arm means further comprising:
    (1) a plurality of first link arm end means each being pivotally secured to one of said piston leg means; and
    (2) a plurality of second link arm end means each being pivotally secured with respect to one of said piston journal means, said second link arm end means being spatially disposed on said piston link arm means remotely from said first link arm end means to achieve pivotally linked interconnection of each of said piston means with respect to said crankshaft means;
  E. a power driveshaft means rotatably mounted within said housing block means adjacent the path of movement of each of said piston leg means;
  F. an idler driveshaft means rotatably mounted within said housing block means at a location spatially disposed from said power driveshaft means, said idler driveshaft means extending generally parallel with respect to said power driveshaft means and opposite therefrom with respect to the path of movement of said piston leg means located therebetween;
  G. a plurality of power clutch bearing means fixedly secured onto said power driveshaft means adjacent each of said piston leg means, each of said power clutch bearing means including a power inner race means fixedly secured to said power driveshaft means and a power outer race means, said power clutch bearing means being adapted to provide said power inner race means in fixed securement with respect to said power outer race means responsive to rotation thereof in a first power direction and being adapted to provide freewheeling rotatable attachment therebetween responsive to rotation thereof in a second power direction;
  H. a plurality of power drive gear means each mounted securely to said power outer race means of one of said power clutch bearing means;
  I. a plurality of power rack gear means each being fixedly secured to said piston leg means and movable therewith adjacent said power driveshaft means and being in engagement with said power driving gear means mounted on said power driveshaft means thereadjacent, said power rack gear means being reciprocally movable with said piston leg means and maintained in continuous engagement with said power driving gear means located thereadjacent;
  J. a power timing gear means fixedly secured to said power driveshaft means;
  K. a plurality of idler clutch bearing means fixedly secured onto said idler driveshaft means adjacent each of said piston leg means, each of said idler clutch bearing means including a idler inner race means fixedly secured to said idler driveshaft means and a idler outer race means, said idler clutch bearing means being adapted to provide said idler inner race means in fixed securement with respect to said idler outer race means responsive to rotation thereof in a first idler direction and being adapted to provide freewheeling rotatable attachment therebetween responsive to rotation thereof in a second idler direction;
  L. a plurality of idler drive gear means each mounted securely to said idler outer race means of one of said idler clutch bearing means;

M. a plurality of idler rack gear means each being fixedly secured to said piston leg means and movable therewith adjacent said idler driveshaft means and being in engagement with said idler driving gear means mounted on said idler driveshaft means thereadjacent, said idler rack gear means being reciprocally movable with said piston leg means and maintained in continuous engagement with said idler driving gear means located thereadjacent;

N. a idler timing gear means fixedly secured to said idler driveshaft means adjacent said power timing gear means and in operative engagement therewith to facilitate driving of said power driveshaft means; and O. a power output shaft means fixedly secured to said power driveshaft means and axially coincident therewith to provide power for delivery as desired.

20. An improved drive mechanism for a reciprocating piston engine comprising:

A. a housing block means defining four cylinder means therein;

B. a crankshaft means rotatably mounted within said housing block means, said crankshaft means including a plurality of piston journal means;

C. four piston means movably positioned within said cylinder means, each of said piston means including a piston head drive surface and a piston leg means extending therefrom, said piston leg means being fixedly secured to said piston means and oriented perpendicularly with respect to said piston head drive surface, each of said piston means and said piston leg means adapted to move axially within said cylinder means without any movement component thereof oriented laterally with respect to the axes of said cylinder means;

D. a piston link arm means pivotally attached with respect to each of said piston leg means and being pivotally attached with respect to each of said piston journal means, said piston link arm means further comprising:
  (1) a plurality of first link arm end means each being pivotally secured to one of said piston leg means; and
  (2) a plurality of second link arm end means each being pivotally secured with respect to one of said piston journal means, said second link arm end means being spatially disposed on said piston link arm means remotely from said first link arm end means to achieve pivotally linked interconnection of each of said piston means with respect to said crankshaft means;

E. a plurality of piston pin means extending through each of said first link arm end means and said piston leg means to maintain pivotally movable engagement therebetween;

F. a power driveshaft means rotatably mounted within said housing block means adjacent the path of movement of each of said piston leg means;

G. an idler driveshaft means rotatably mounted within said housing block means at a location spatially disposed from said power driveshaft means, said idler driveshaft means extending generally parallel with respect to said power driveshaft means and opposite therefrom with respect to the path of movement of said piston leg means located therebetween;

H. a plurality of power clutch bearing means fixedly secured onto said power driveshaft means adjacent each of said piston leg means, each of said power clutch bearing means including a power inner race means fixedly secured to said power driveshaft means and a power outer race means, said power clutch bearing means being adapted to provide said power inner race means in fixed securement with respect to said power outer race means responsive to rotation thereof in a first power direction being clockwise and being adapted to provide freewheeling rotatable attachment therebetween responsive to rotation thereof in a second power direction being counterclockwise;

I. a plurality of power drive gear means each mounted securely to said power outer race means of one of said power clutch bearing means;

J. a plurality of power rack gear means each being fixedly secured to said piston leg means and movable therewith adjacent said power driveshaft means and being in engagement with said power driving gear means mounted on said power driveshaft means thereadjacent, said power rack gear means being reciprocally movable with said piston leg means and maintained in continuous engagement with said power driving gear means located thereadjacent;

K. a power timing gear means fixedly secured to said power driveshaft means;

L. a plurality of idler clutch bearing means fixedly secured onto said idler driveshaft means adjacent each of said piston leg means, each of said idler clutch bearing means including a idler inner race means fixedly secured to said idler driveshaft means and a idler outer race means, said idler clutch bearing means being adapted to provide said idler inner race means in fixed securement with respect to said idler outer race means responsive to rotation thereof in a first idler direction being counterclockwise and being adapted to provide freewheeling rotatable attachment therebetween responsive to rotation thereof in a second idler direction being clockwise;

M. a plurality of idler drive gear means each mounted securely to said idler outer race means of one of said idler clutch bearing means;

N. a plurality of idler rack gear means each being fixedly secured to said piston leg means and movable therewith adjacent said idler driveshaft means and being in engagement with said idler driving gear means mounted on said idler driveshaft means thereadjacent, said idler rack gear means being reciprocally movable with said piston leg means and maintained in continuous engagement with said idler driving gear means located thereadjacent, each of said idler rack gear means being oppositely positioned on said piston leg means from said power rack gear means positioned thereon;

O. a idler timing gear means fixedly secured to said idler driveshaft means adjacent said power timing gear means and in operative engagement therewith to facilitate driving of said power driveshaft means; and P. a power output shaft means fixedly secured to said power driveshaft means and axially coincident therewith to provide power for delivery as desired.

* * * * *